Aug. 26, 1947.  J. B. GOLDBERG  2,426,197
NOW BY JUDICIAL CHANGE OF NAME
J. B. GREER
SCREW DRIVER
Filed June 9, 1943   3 Sheets-Sheet 1
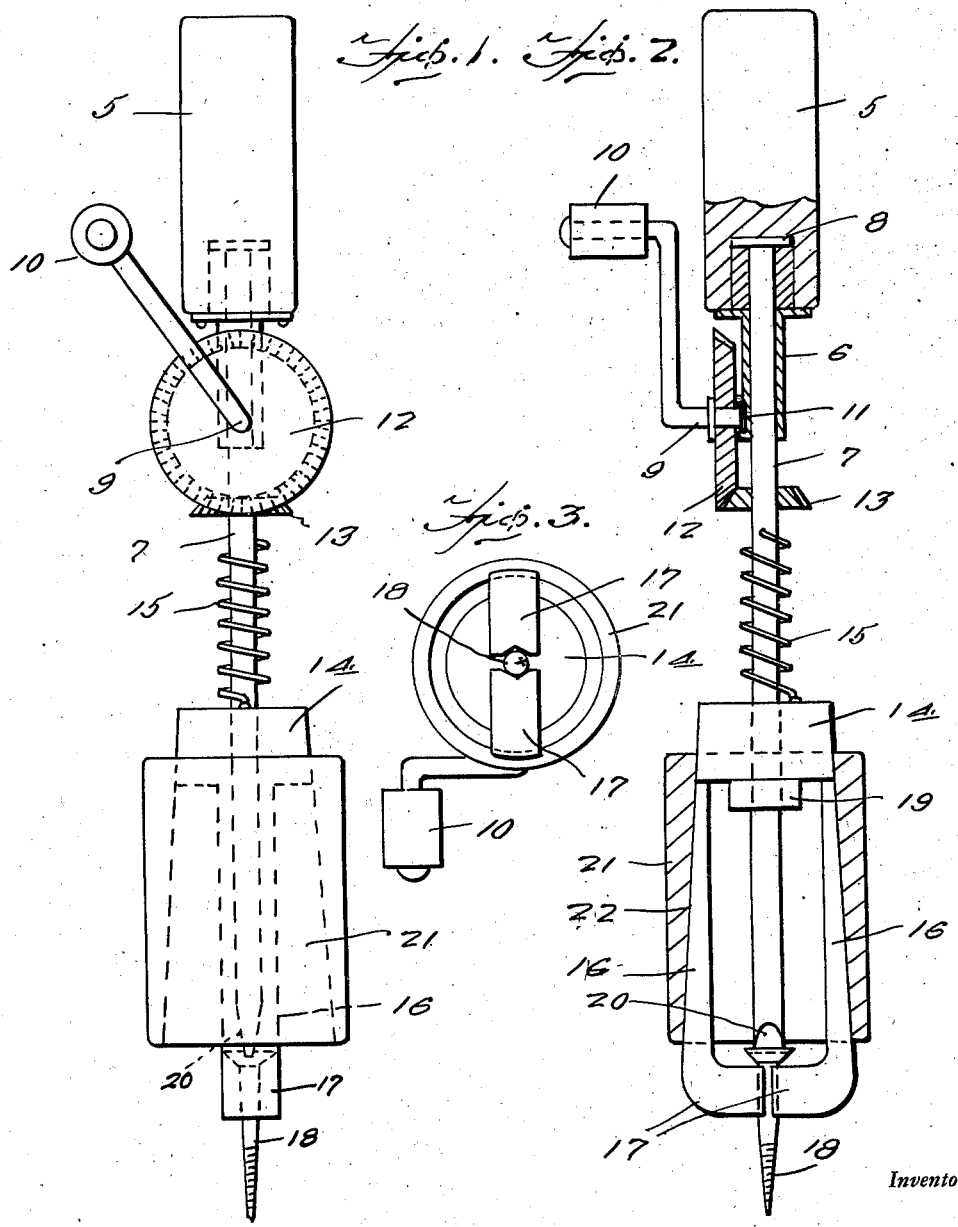
Inventor
James B. Greer
By Clarence A. O'Brien
and Harvey B. Jacobson
Attorneys

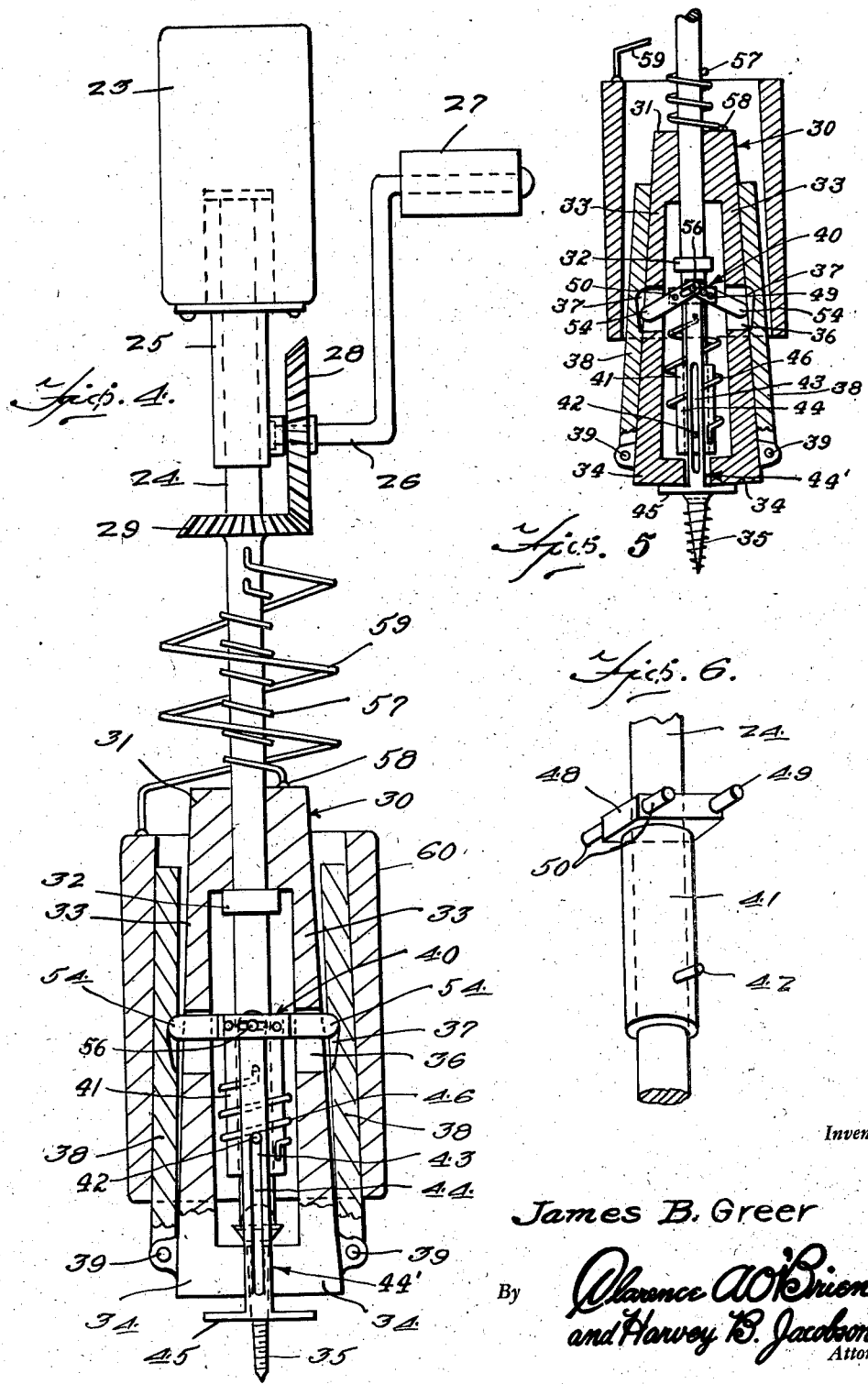

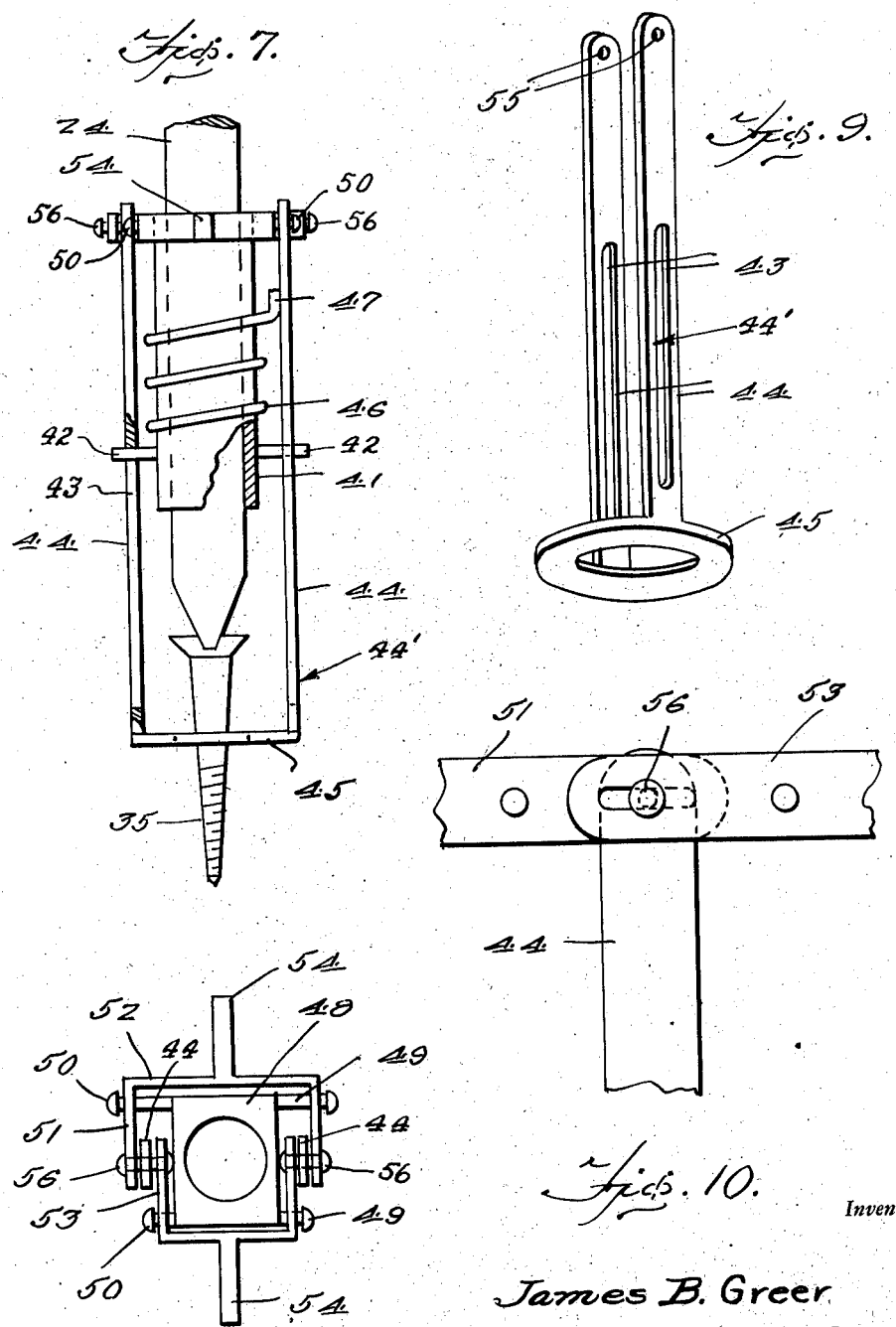

Patented Aug. 26, 1947

2,426,197

UNITED STATES PATENT OFFICE 2,426,197

SCREW DRIVER

James Block Goldberg, Kansas City, Mo., now by Judicial change of name James B. Greer Application June 9, 1943, Serial No. 490,205

3 Claims. (Cl. 145—52)

This invention relates to new and useful improvements in screw drivers, the principal object being to provide a screw driver which includes means for firmly holding a screw to the driver while the screw is being driven.

Another important object of the invention is to provide a screw driver having screw retaining means which can be readily manipulated for holding or detaching the driver from a screw.

Another important object of the invention is to provide a screw driver having screw holding means which can be operated to release position when a screw has been driven a predetermined distance into work.

Other objects and advantages of the invention will become apparent to the reader of the following description.

In the drawings:

Figure 1 represents a slide elevational view of one form of the invention.

Figure 2 is a vertical sectional view through the form of the invention shown in Figure 1.

Figure 3 is a bottom plan view of the form of the invention as shown in Figure 1.

Figure 4 is a vertical sectional view through a modified form of the invention.

Figure 5 is a view similar to Figure 4 showing the part in retracted position.

Figure 6 is a fragmentary perspective view of the slide and release unit of the modified form.

Figure 7 is a fragmentary side elevational view showing the slide and release unit alone of the modified form.

Figure 8 is a top plan view of the modified structure shown in Figure 7 with the driver removed.

Figure 9 is a perspective view of the actuating part of the silde and releasing unit of the modified form.

Figure 10 is a fragmentary enlarged side elevational view showing the rockable fingers of the modified form.

Referring to the drawings wherein like numerals designate like parts, it can be seen that numeral 5 denotes a handle having a depending barrel 6 into which the upper end of a shaft 7 is disposed, the shaft 7 having a head 8 located within the handle 5, whereby the shaft is swivelly connected to the handle 5.

A shaft 9 extends at right angles from the barrel 6 and has a crank handle 10, the shaft 9 being journaled on the barrel 6 as at 11 in any suitable manner and carrying a beveled gear 12 which meshes with a beveled pinion 13 suitably keyed to the shaft 7.

On the shaft 7 is a cylindrical block 14 which is connected to the shaft 7 by a coiled compressible spring 15.

A pair of leg members 16, 16 depend from the block 14, gradually tapering longitudinally and these legs are provided with inturned jaw members 17, 17, the same having channeled opposed portions for accommodating a screw 18 to be driven.

The lower portion of the shaft 7 extends downwardly through the block 14 and has a fixed collar 19 theron against which the block 14 abuts. The lower end of the shaft 7 is tapered as at 20 to engage into the kerf of the head of the screw 18.

A shell 21 having a tapered opening therethrough is slidably disposed on the legs 16, 16.

Obviously, the legs 16, 16 are of a spring nature, and when the shell 21 is lifted, the legs 16, 16 are freed so that the jaws 17, 17 separate and release the screw 18, that is, after the screw has been partly driven into work.

Obviously the screw 18 is driven by rotating the crank handle 10 and in turn the shaft 7.

A modification of the invention is shown in Figures 4 to 10, inclusive, it being seen that numeral 23 denotes a handle into which a shaft 24 is journaled for rotation. The handle 23 has a depending barrel 25 on which one end of a laterally disposed shaft 26 is journaled, this shaft 26 being provided with a crank handle 27. On the shaft 26 is a beveled gear 28 meshing with a beveled gear 29, the latter being carried by the shaft 24.

A clamp unit generally referred to by numeral 30 consists of a block 31 through which the shaft 24 is rotatably disposed, the shaft 24 having a stop collar 32 against which the block 31 abuts. The block 31 has a pair of depending spring legs 33, 33 provided with inturned jaw members 34, 34, grooved to receive a screw 35. The intermediate portions of the legs 33, 33 are formed with short slots 36, 36 which are opposed to inclined channels 37, 37 in a pair of pivotal arms 38, 38. The arms 38, 38 have their lower ends hingedly secured as at 39 to the lower portions of the legs 33, 33.

Numeral 40 generally refers to the slide and release mechanism, this consisting of a sleeve 41 secured to the shaft 24 and on this sleeve 41 are laterally disposed pins 42 which project through slots 43, 43 in leg members 44, 44 which upstand from a ring 45 located below the jaws 34, 34 and through which a screw 35 projects when the screw is properly held by the holding means, as shown in Figure 4.

On the sleeve 41 is a coiled compression spring 46, one end of which is secured to the sleeve 41 while the other end is secured to one of the legs 44 as at 47, to urge the leg members 44 and their accompanying mechanism upwardly on the screw-driver shaft 24 (see Figure 7).

Slidably mounted on the shaft 24 between the upper end of the sleeve 41 and the stop collar 32 is a square collar 48 having two pairs of oppositely disposed pins 49, 50 projecting laterally therefrom and these pins pass through the leg portions 51 of a pair of U-shaped yokes 52, 53 (see Figure 8). Each of the yokes 52, 53 has a rigid finger 54 projecting therefrom, and through the corresponding slots 36 of one of the legs 33 and into the channel 37 of the corresponding arm 38, as shown in Figure 4.

The legs 44 are apertured at their upper ends as at 55 and interlap the adjacent ends of the legs of the yokes 51, 53 and rivets or pivot pins 56 are disposed through these interlapping parts so that they are pivotally connected together.

As can be seen in Figure 4, numeral 57 denotes a compression coiled spring which has one end secured to the shaft 24 and the other end secured as at 58 to the block 31. A retractile spring 59 of somewhat larger diameter has one end secured to the shaft 24 while its opposite end is secured to an internally tapered shell 60 which rides the arms 38, 38.

It can now be seen that with the parts in the position shown in Figure 4, the screw 35 can be driven into work until the ring 45 strikes the surface of the work whereupon the legs 44 will be forced inwardly (provided the shaft 24 is further rotated) and this will rotate the yokes 52, 53 about their pivots 49 and 50 and thereby disengage the fingers 54, 54 from the channels 37, 37. This results in the freeing of the shell 60, so that the spring 59 will slide the shell longitudinally in an inward direction on the arms 38, 38, and permit the legs 33, 33 to expand, separating the jaws 34, 34. This movement of shell 60 inwardly on the shaft 24, completely frees the jaws from the screw and allows the ring 45 to be retracted under the influence of the spring 46.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

1. The combination with a screw-driver having a shank, a shank rotating means at one end thereof, a screw slot engaging bit at the opposite end of the shank and a stop collar intermediate the rotating means and the bit, of a screw holder comprising a body slidable on the shank between the rotating means and the stop collar, yieldingly expansible legs extending from the body toward the bit, screw holding jaws at the free ends of the legs, arms pivoted to the legs, a sleeve surrounding the arms and adapted to move the jaws into screw clamping position as it is advanced toward the screw-driver bit, a spring adapted to retract the sleeve and means to hold the arms expanded against the sleeve frictionally to hold the sleeve in advanced position against the force of the spring.

2. The combination with a screw-driver having a shank, a shank rotating means at one end thereof, a screw slot engaging bit at the opposite end of the shank and a stop collar intermediate the rotating means and the bit, of a screw holder comprising a body slidable on the shank between the rotating means and the stop collar, yieldingly expansible legs extending from the body toward the bit, screw holding jaws at the free ends of the legs, arms pivoted to the legs, a sleeve surrounding the arms and adapted to move the jaws into screw clamping position as it is advanced toward the screw-driver bit, a spring adapted to retract the sleeve, means to hold the arms expanded against the sleeve and the sleeve in advanced position against the force of the spring, a work-engaging collar encompassing the screw about midway of its length, and means associated with the collar to release the arm expanding means when the collar contacts the work.

3. The combination with a screw-driver having a shank, a shank rotating means at one end thereof, a screw slot engaging bit at the opposite end of the shank and a stop collar intermediate the rotating means and the bit, of a screw holder comprising a body slidable on the shank between the rotating means and the stop collar, yieldingly expansible legs extending from the body toward the bit, screw holding jaws at the free ends of the legs, arms pivoted to the legs, a longitudinally movable sleeve surrounding the arms, a spring adapted to retract the sleeve, means to hold the arms expanded against the sleeve frictionally to hold the sleeve in advanced jaw closing position, work actuated means to release the expanded arms and permit the sleeve to retract from jaw holding position, and yielding means for holding the body against the collar whereby, as the screw is advanced into the work, the screw holder may move longitudinally with relation to the screw-driver shank.

JAMES B. GOLDBERG.

REFERENCES CITED

The following references are of record in the file of this patent:

UNITED STATES PATENTS

| Number | Name | Date |
|---|---|---|
| 864,633 | Feigley et al. | Aug. 27, 1907 |
| 873,771 | McCoy | Dec. 17, 1907 |
| 1,441,972 | Doherty | Jan. 9, 1923 |
| 1,497,642 | Rowe | June 10, 1924 |
| 1,687,788 | Pinkus | Oct. 16, 1928 |
| 1,770,182 | Ritter | July 8, 1930 |
| 415,481 | Teubner | Nov. 19, 1889 |
| 686,192 | Bailey | Nov. 5, 1901 |
| 1,496,093 | Mockett | June 3, 1924 |
| 1,424,703 | Work | Aug. 1, 1922 |